(12) United States Patent
Teng

(10) Patent No.: US 7,192,134 B2
(45) Date of Patent: Mar. 20, 2007

(54) EYEGLASSES WITH AUXILIARY EYEGLASSES

(75) Inventor: Wei-Che Teng, Tainan (TW)

(73) Assignee: Irene Corporation, Tainan (TW)

( * ) Notice: Subject to any disclaimer, the term of this patent is extended or adjusted under 35 U.S.C. 154(b) by 143 days.

(21) Appl. No.: 10/908,001

(22) Filed: Apr. 25, 2005

(65) Prior Publication Data

US 2006/0238697 A1    Oct. 26, 2006

(51) Int. Cl.
*G02C 9/00* (2006.01)
(52) U.S. Cl. .......................................... 351/47; 351/57
(58) Field of Classification Search ................ 351/47, 351/57, 41, 44, 48, 58, 158
See application file for complete search history.

(56) References Cited

U.S. PATENT DOCUMENTS 6,386,703 B1 *    5/2002    Huang .......................... 351/57
6,749,299 B1 *    6/2004    Hsu ............................. 351/62
7,029,114 B2 *    4/2006    Smith ........................... 351/47

* cited by examiner

*Primary Examiner*—Hung Xuan Dang
(74) *Attorney, Agent, or Firm*—Alan D. Kamrath; Nikolai & Mersereau, P.A.

(57) ABSTRACT

The present invention relates to a pair of eyeglasses with auxiliary eyeglasses comprising a pair main eyeglasses having a main frame and a pair of lenses fitted therein, a rear horizontal recess in a bridge, a vertical hole of square section having its top open to the recess, a nosepad, and two temples, auxiliary eyeglasses having an auxiliary frame and a pair of lenses fitted therein, and a forward projection in a bridge thereof, a shape of the projection being conformed to that of the recess, and a latch member of circular section extended downwardly from the projection. Snapping the projection into the recess will insert the latch member into the hole for lockingly engaging therewith and support the bridge of the eyeglass frame by the nosepad. The engagement is reliable and secure. Also, both assembly and disassembly thereof can be done easily.

5 Claims, 3 Drawing Sheets

EYEGLASSES WITH AUXILIARY EYEGLASSES

BACKGROUND OF THE INVENTION

1. Field of Invention

The present invention relates to eyeglasses and more particularly to such a pair of eyeglasses adapted to lockingly engage with a detachable auxiliary eyeglass frame.

2. Related Art

Eyeglasses adapted to engage with an auxiliary eyeglass frame are well known. Conventionally, the main eyeglasses have a recess in its either endpiece and the auxiliary eyeglass frame has a tab also in its either endpiece. The tabs are adapted to engage with the recesses by snapping.

However, the prior art suffered from a couple of disadvantages. For example, the snapping engagement is not reliable, resulting in a possible disengagement of the tabs and the recesses especially after a period time of use. Further, alignment of either pair of the tab and the recess is required to be precise. Otherwise, the desired engagement of the tab and the recess in either pair is not possible. This in turn may require a high precision in the manufacturing process. As a result, the manufacturing cost is increased significantly. This is not desirable in this competitive market. Thus, a need for improvement exists.

SUMMARY OF THE INVENTION

It is therefore an object of the present invention to provide a pair of eyeglasses with auxiliary eyeglasses comprising a pair of main eyeglasses having a main frame and a pair of lenses fitted therein, a pair of auxiliary eyeglasses having an auxiliary frame and a pair of lenses fitted therein, and two temples attached to the main frame of the main eyeglasses; wherein the main frame comprising a horizontal recess in a bridge, a vertical hole having its top open to the recess and the auxiliary frame comprising a forward projection in a bridge thereof, a shape of the projection being conformed to that of the recess, and a latch member extended downwardly from the projection, a shape of the latch member being conformed to that of the hole; whereby snapping the projection into the recess will insert the latch member into the hole for lockingly engaging therewith. By utilizing this lens combination, the engagement is reliable and secure. Also, both assembly and disassembly thereof can be done in a simple easy manner.

In one aspect of the present invention, the latch member has an arch section.

The above and other objects, features and advantages of the present invention will become apparent from the following detailed description taken with the accompanying drawings.

DETAILED DESCRIPTION OF THE INVENTION

Figure 1:
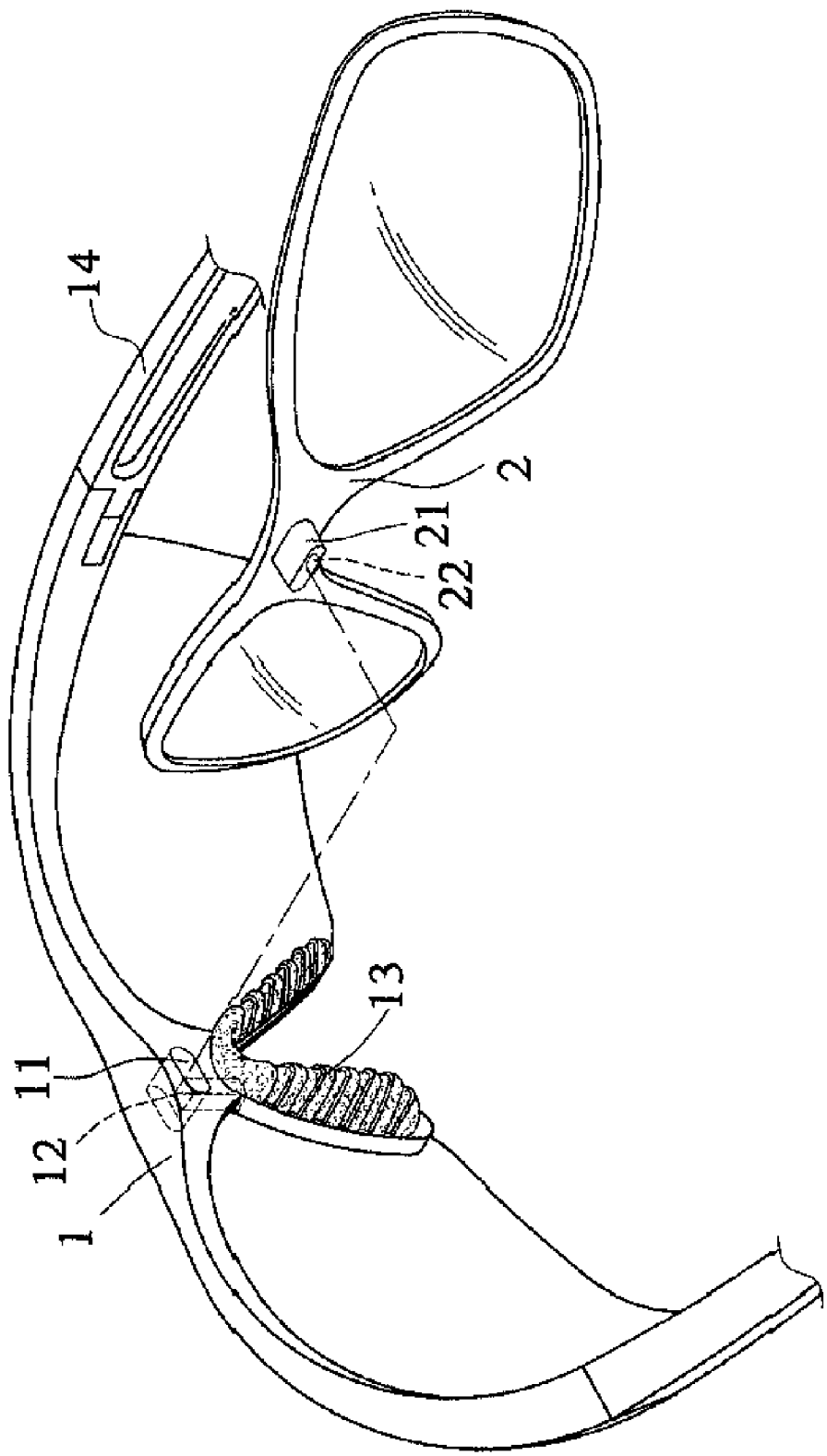
FIG. 1 is an exploded view of a preferred embodiment of a pair of eyeglasses with auxiliary eyeglasses according to the invention.

Referring to FIG. 1, there is shown a pair of main eyeglasses with auxiliary eyeglasses constructed in accordance with a preferred embodiment of the invention. The main eyeglasses comprise a pair of lenses fitted in a main frame 1, a rear horizontal recess 11 in a bridge, a vertical hole 12 of square section having a blind bottom end and its top open to the recess 11, a nosepad 13, and two temples 14. The auxiliary eyeglasses comprise a pair of lenses fitted in an auxiliary frame 2, a forward projection 21 in a bridge, the shape of the projection 21 being conformed to that of the recess 11, and a latch member 22 of arch section extended downwardly from the projection 21.

Figure 2:
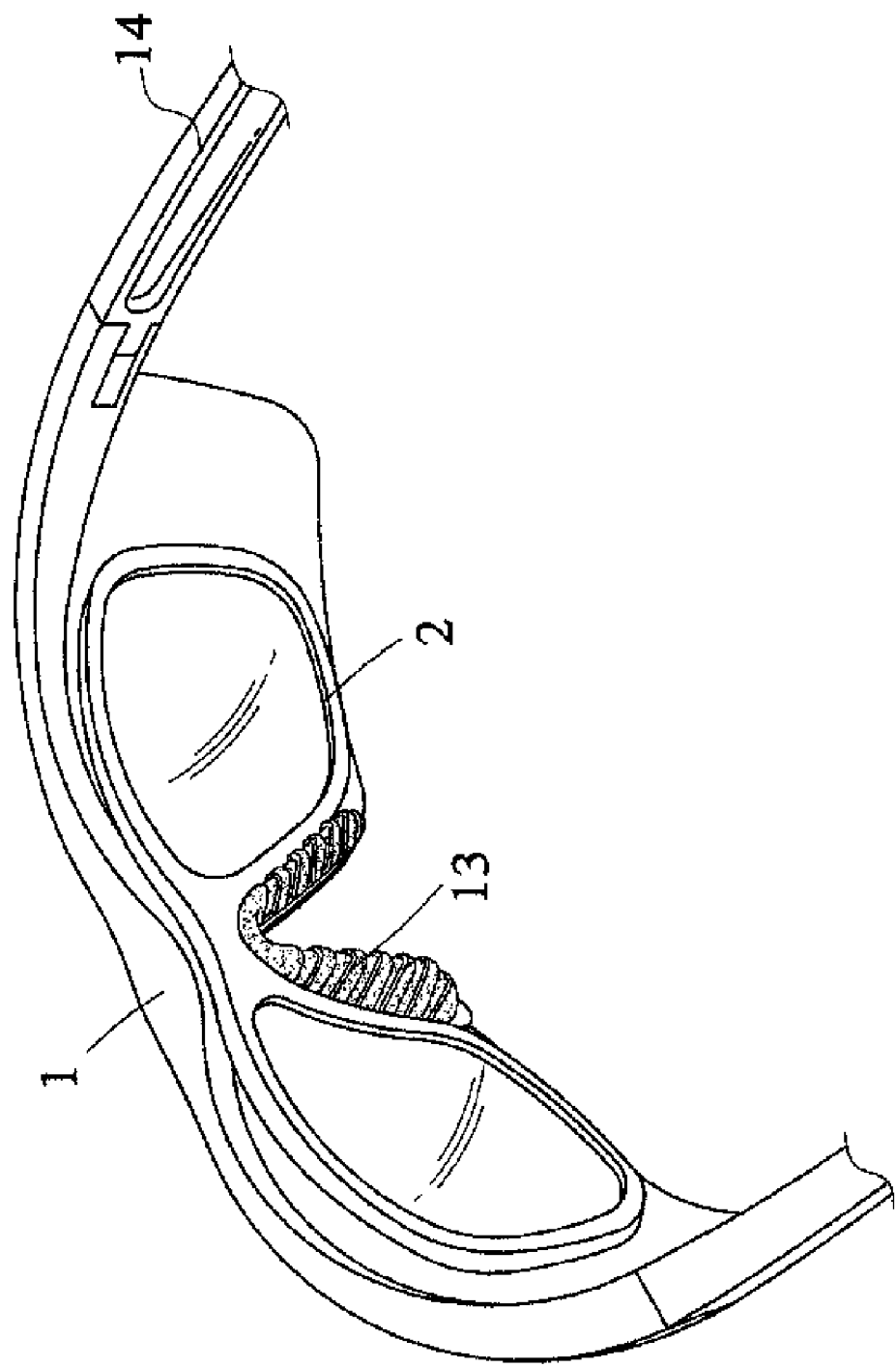
FIG. 2 is a perspective view of the assembled eyeglasses and auxiliary eyeglasses in FIG. 1.
Figure 3:
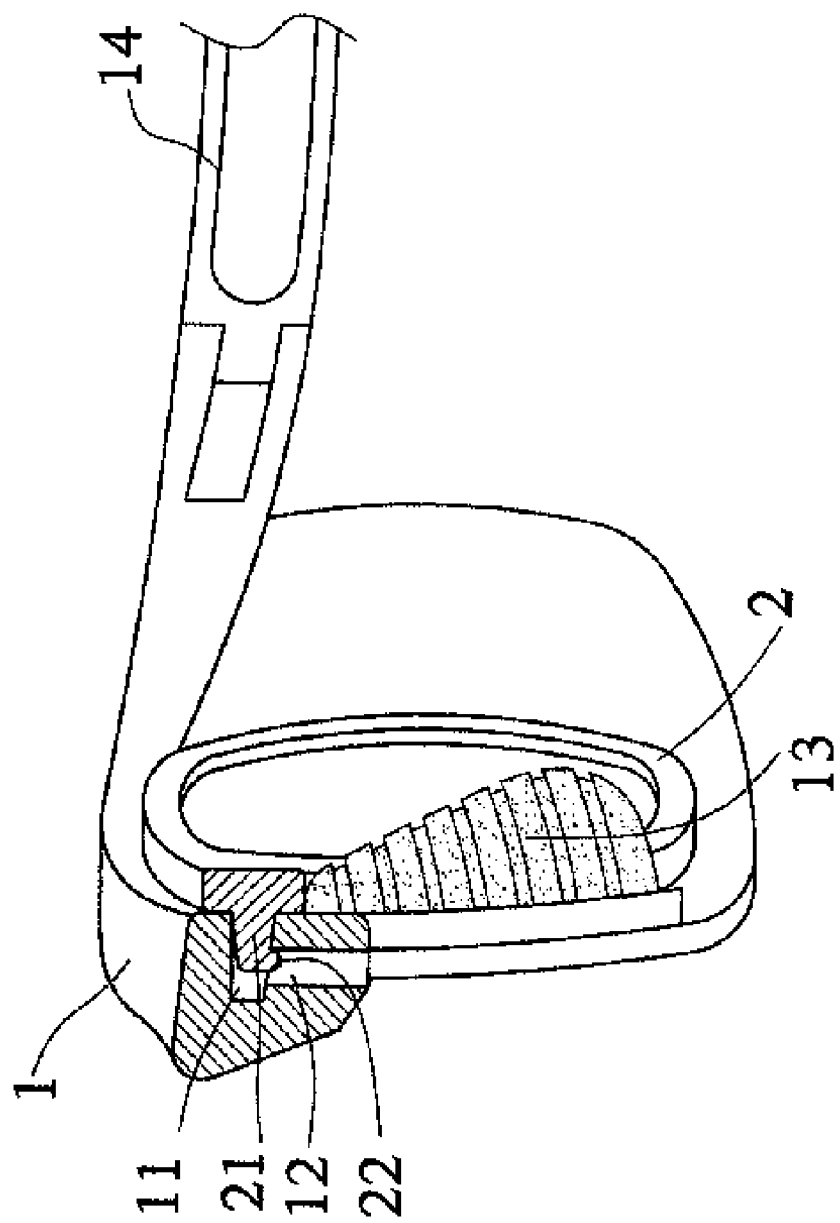
FIG. 3 is a vertical sectional view of a bridge portion of the assembled eyeglasses and auxiliary eyeglasses in FIG. 2.

Referring to FIGS. 2 and 3, an assembly of the invention is as follows. Snap the projection 21 into the recess 11 until the arch latch member 22 being forced into the hole 12. In this position, the latch member 22 is lockingly engaged with the hole 12. Also, the bottom of the bridge of the auxiliary frame 2 is supported by the nosepad 13 of the main frame 1. Such engagement is reliable and secure. It is understood that detachment of the same can be done in a reverse operation by simply disengaging the auxiliary frame 2 with the main frame 1 by pulling the projection 21 out of the recess 12.

While the invention herein disclosed has been described by means of specific embodiments, numerous modifications and variations could be made thereto by those skilled in the art without departing from the scope and spirit of the invention set forth in the claims.

What is claimed is:

1. A pair of eyeglasses with auxiliary eyeglasses comprising a pair of main eyeglasses having a main frame and a pair of lenses fitted therein, a pair of auxiliary eyeglasses having an auxiliary frame and a pair of lenses fitted therein, and two temples attached to the main frame of the main eyeglasses;

wherein the main frame comprising a horizontal recess in a bridge, a vertical hole having its top open to the recess and the auxiliary frame comprising a forward projection in a bridge thereof, a shape of the projection being conformed to that of the recess, and a latch member extended downwardly from the projection, a shape of the latch member being conformed to that of the hole;

whereby snapping the projection into the recess will insert the latch member into the hole for lockingly engaging therewith.

2. A pair of eyeglasses with auxiliary eyeglasses of claim 1, wherein the latch member has an arch section.

3. A pair of eyeglasses with auxiliary eyeglasses of claim 1, wherein the bottom of bridge of the auxiliary frame has a shape matching the nosepad and is supported by the nosepad.

4. A pair of eyeglasses with auxiliary eyeglasses of claim 1, wherein the auxiliary eyeglasses are optical spectacles.

5. A pair of eyeglasses with auxiliary eyeglasses of claim 1, wherein the main eyeglasses are sunglasses.

* * * * *